July 27, 1926.
P. BRASHER
BREAKWATER
Filed Jan. 25, 1924
1,593,863
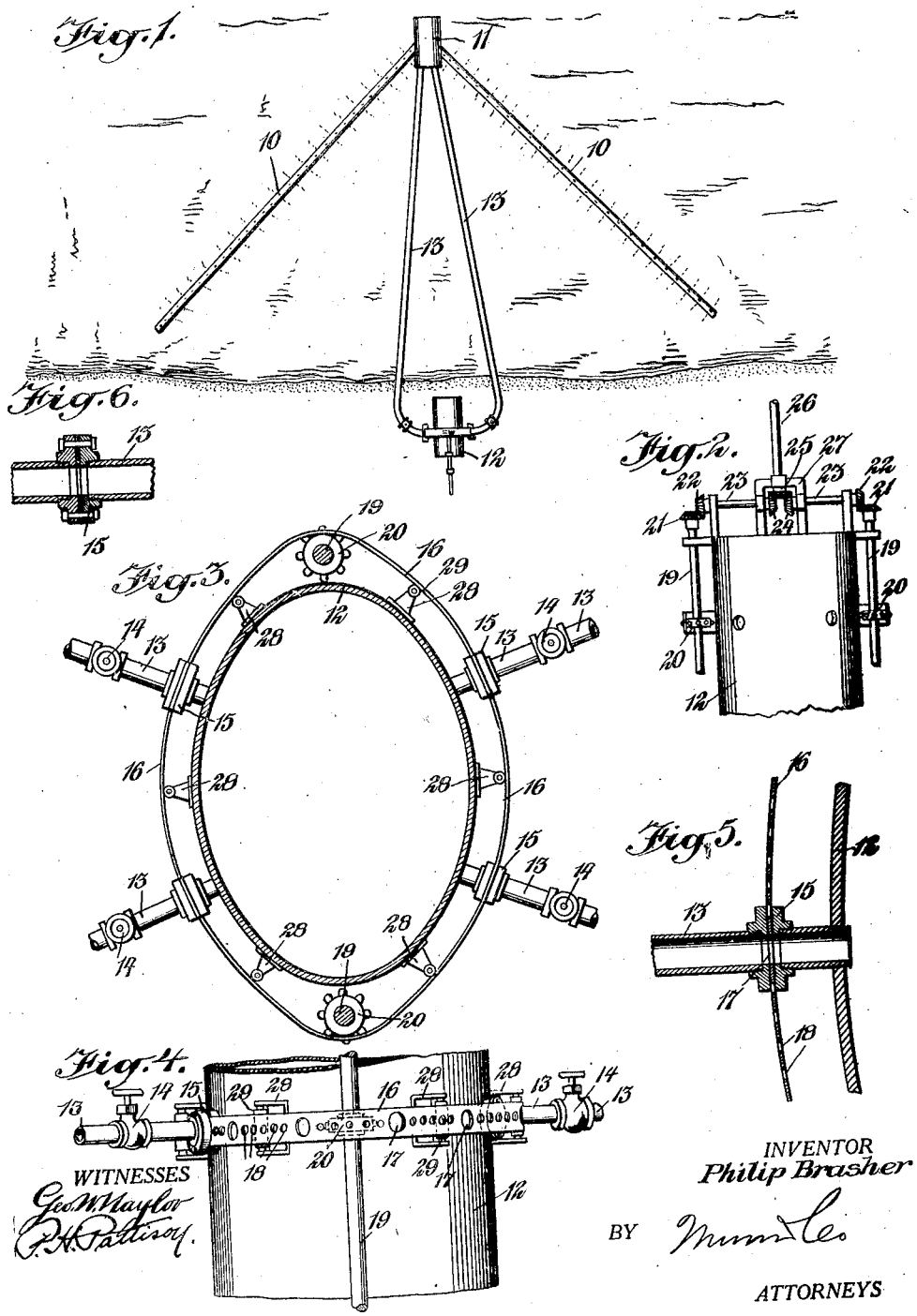
INVENTOR
Philip Brasher
WITNESSES
BY
ATTORNEYS Patented July 27, 1926.

1,593,863

UNITED STATES PATENT OFFICE.

PHILIP BRASHER, OF BROOKLYN, NEW YORK.

BREAKWATER.

Application filed January 25, 1924. Serial No. 688,598.

The present invention relates to new and useful improvements in breakwater construction and operation, and it pertains more particularly to an improvement on the type of apparatus disclosed in my prior United States Patent No. 843,926, granted February 12, 1907.

It is one of the objects of the present invention to provide a new and improved type of air breakwater which intermittently discharges blasts of air through the body of water to be quieted, as distinguished from the apparatus shown in the above-mentioned patent in which the discharge of air is constant.

It is a further object of the invention to provide an apparatus which is capable of operation in such a manner that it will discharge blasts of air through the body of water to be quieted at predetermined intervals corresponding with the intervals between the seas or waves to be dissipated.

It is a further object of the invention to construct the apparatus so that the periods of discharge may be timed to correspond with the seas to be dissipated.

With the above and other objects in view, reference is had to the accompanying drawings, in which—

Figure 1 is a top plan view showing one manner of installing a breakwater constructed in accordance with the present invention;

Fig. 2 is a detail view in elevation showing a portion of the mechanism employed in connection with the apparatus;

Fig. 3 is a transverse sectional view showing the mechanism employed for controlling the intermittent discharge of air;

Fig. 4 is a view in elevation of the apparatus shown in Fig. 3;

Fig. 5 is an enlarged detail sectional view showing the control for intermittently discharging the air;

Fig. 6 is a similar view taken at right angles to Fig. 5.

In carrying out the invention, perforated pipes, such as those designated by the reference numeral 10, are laid preferably on the bottom of the body of water which is to be quited. In the present instance, these pipes are shown as arranged in V form, but it is to be understood that this is merely an arbitrary showing and that the pipes may be laid in any relation to one another to obtain the best results. The pipes are connected to a member 11, which forms a manifold or chamber, and such member 11 is connected with a manifold or chamber 12 on the beach or at a point on the land by means of pipes or the like, 13. It is obvious that any desired number of pipes 13 may be employed, the number being used depending upon the number of pipes 10 and the volume of air to be discharged and the direction in which the air is to be conveyed.

As more clearly shown in Figs. 3 to 5, inclusive, the member 12 consists of a hollow member, preferably of tubular form, and the pipes 13 lead therefrom and are each provided with a control valve 14. Interposed in each of these pipes 13, adjacent the member 12, there is a stuffing box or the like, 15, and passing through said stuffing box 15, there is an endless flexible band 16 of metal or other suitable material. As more clearly shown in Fig. 4, this flexible band 16 is provided at spaced intervals with enlarged openings 17, preferably circular in form, and interposed between these enlarged openings 17, there is a plurality of smaller openings 18. Mounted on opposite sides of the member 12 are two shafts 19 and each of these shafts carries a sprocket or the like, 20, the teeth of which are adapted to engage in the openings 17 and 18 to cause the flexible band 16 to move around the member 12, and through the stuffing box 15 when the shafts 19 are rotated. Each of the shafts 19 is provided on one end with a bevel gear 21, and meshing with said bevel gears 21 are bevel gears 22 carried by shafts 23. Also carried by the shafts 23 and mounted on the ends opposite to that on which the bevel gears 22 are mounted, are bevel gears 24, and meshing with threse bevel gears 24 there is a bevel gear 25 carried by a shaft 26, which shaft provides, through the medium of its bevel gear 25, the means by which the shafts 23 and 19 are driven. The shafts 23 and the shaft 26 are mounted in a suitable bracket or other support, 27, as shown in Fig. 2. Mounted at spaced intervals about the member 12 are brackets 28, and carried by each of the brackets 28, there is a roller 29, said rollers serving to guide the flexible band 16 as the same is driven about the member 12.

The device operates in the following manner:

The shaft 26 being driven through the medium of the shafts 23 and 19, the flexible band 16 will be caused to move about the member 12. As the flexible band 16 moves about the member 12, the several openings therein, that is, the openings 17 and 18, will come into register with the pipes 13, and permit of a discharge of air from the member 12 to the pipes 13, it being understood that the member 12 is supplied with air under pressure in any desired manner. As the openings 18 register with the pipes 13, due to the reduced sizes of the openings 18, the volume of air discharged from the member 12 will be considerably less than that discharged when the openings 17 register with the pipes 13.

By this construction it is apparent that each time one of the openings 17 registers with one of the pipes 13, an increased volume of air will be discharged through the pipes 13, thus increasing the pressure within the pipes 13 and the pressure of the air discharged from the pipes 10. Inasmuch as these enlarged openings 17 are spaced with respect to one another, the discharge of air in greater volume and at a higher pressure will be intermittent.

Further, it will be noted that by determining the speed at which the flexible band 16 is moved about the member 12, the periods at which the greater volume and pressure are discharged, may be regulated, and by a proper adjustment this discharge of greater volume and high pressure can be timed to correspond with the periodicity of the seas or waves to be dissipated.

Having thus described my invention, what is claimed is:—

1. In a breakwater of the type described, means for intermittently discharging air beneath the surface of the water, and means for intermittently increasing the pressure under which said air is discharged.

2. In a device for dissipating seas or waves, means for discharging air under pressure below the surface of the body of water in which said seas or waves occur, and means for intermittently increasing the pressure of the discharged air.

3. The method of dissipating seas or waves which consists in discharging air beneath said seas or waves and intermittently varying the pressure of said discharged air.

4. In an apparatus for dissipating seas or waves, perforated pipes submerged beneath the seas or waves to be dissipated, a manifold containing air under presure, pipes connecting the manifold with the perforated pipes and adapted to convey air from the manifold to the perforated pipes, and means for intermittently discharging the air of the manifold into the second-mentioned pipes whereby the same may be intermittently discharged from the perforated pipes.

5. In an apparatus for dissipating seas or waves, perforated pipes submerged beneath the seas or waves to be dissipated, a manifold containing air under pressure, pipes for conveying the air under pressure from the manifold to the perforated pipes from which it is discharged, and means for intermittently increasing said pressure, said last-mentioned means being variable.

6. In an apparatus of the character described, a manifold, a plurality of discharge pipes leading therefrom, a stuffing box in each of said discharge pipes, a perforated control member passing through said stuffing box and controlling the discharge of air from the manifold through said pipes, and means for moving said perforated control member through the stuffing box.

7. In an apparatus of the character described, a manifold adapted to contain fluid under pressure, a plurality of discharge pipes leading from said manifold, a stuffing box mounted in each of said discharge pipes and spaced with respect to the manifold, a perforated flexible endless member passing through said stuffing boxes and adapted by means of its perforations to control the discharge of fluid from the manifold through the discharge pipes, and means adapted for engagement with the perforations in said flexible member for moving the same through the stuffing boxes to control said discharge of fluid.

8. In an apparatus of the character described, a manifold adapted to contain air under pressure, a plurality of discharge pipes leading from said manifold, a stuffing box mounted in each of said discharge pipes and spaced with respect to the manifold, a perforated flexible endless member passing through said stuffing boxes and adapted by means of its perforations to control the discharge of air from the manifold through the discharge pipes, and means adapted for engagement with the perforations in said flexible member for moving the same through the stuffing boxes to control said discharge of air, said last-mentioned means comprising toothed members having engagement with the perforations in the endless flexible member, and means for driving said toothed members.

PHILIP BRASHER.